United States Patent [19]
Layden et al.

[11] Patent Number: 5,619,076
[45] Date of Patent: Apr. 8, 1997

[54] METHOD AND APPARATUS FOR CONNECTION AND DISCONNECTION OF BATTERIES TO UNINTERRUPTIBLE POWER SYSTEMS AND THE LIKE

[75] Inventors: David L. Layden, New Lisbon; Michael J. Cane, Mauston; Robert Bishop, Tomah, all of Wis.

[73] Assignee: General Signal Power Systems, Inc., Waukesha, Wis.

[21] Appl. No.: 358,524

[22] Filed: Dec. 19, 1994

[51] Int. Cl.⁶ ............................................. H01H 3/32
[52] U.S. Cl. ................ 307/48; 307/112; 307/116; 307/119; 307/125; 307/134; 307/139; 307/141; 307/12; 320/1
[58] Field of Search ................................. 320/1; 307/112, 307/116, 119, 125, 134, 139, 141, 12

[56] References Cited

U.S. PATENT DOCUMENTS

| | | | |
|---|---|---|---|
| 3,666,961 | 5/1972 | Bogue et al. | 307/65 |
| 4,618,803 | 10/1986 | Hardy | 315/241 |
| 5,099,187 | 3/1992 | Rippel | 320/1 |
| 5,144,163 | 9/1992 | Matsuzawa | 307/446 |
| 5,315,533 | 5/1994 | Stich et al. | |

OTHER PUBLICATIONS

A copy of pp. 10 and 11 of brochure by Anderson Power Products, 1994 and earlier, showing SB connectors.

Primary Examiner—William M. Shoop, Jr.
Assistant Examiner—Kim Lockett
Attorney, Agent, or Firm—Foley & Lardner

[57] ABSTRACT

Connection of batteries to the DC bus lines across which capacitors are connected in power systems, such as uninterruptible power systems, is carried out using an auxiliary switch which is controlled to connect the batteries to a DC bus line through a precharge resistor momentarily before connection is made through a main connector. The preconnection of the batteries through the precharge resistor provides a controlled rate of charge of the capacitors before closing of the main connector to thereby avoid excessive surge currents. When the main connector is opened, as when the power system is prepared for transportation or long term storage, the auxiliary switch interrupts the current path from the battery through the precharge resistor and provides a current path from the DC bus line through a discharge resistor to ground to bleed down the charge on the capacitors to a desired level within a selected period of time.

21 Claims, 3 Drawing Sheets

METHOD AND APPARATUS FOR CONNECTION AND DISCONNECTION OF BATTERIES TO UNINTERRUPTIBLE POWER SYSTEMS AND THE LIKE

FIELD OF THE INVENTION

This invention pertains generally to the field of electrical power systems, and particularly to power systems such as uninterruptible power supplies which utilize batteries for energy storage.

BACKGROUND OF THE INVENTION

Uninterruptible power supplies or systems (commonly referred to as UPS) are used to provide back-up power to critical loads such as computer systems where loss of line power can result in the interruption of programs and loss of valuable data. A typical UPS includes a battery or a series of batteries interfaced through an inverter to the AC output line. When a fault occurs in the input AC power, the inverter is controlled to provide power from the battery to the AC output line at the same frequency and with substantially the same waveform as the normal input AC power.

Although there are various basic designs for UPS which utilize a battery as the backup power source, in many if not most types of UPS a large capacitor (or capacitors) is connected across the DC bus lines to which the battery and inverter are connected. The capacitor, which may have a large capacitance value, serves to filter out peaks in the voltage on the DC bus lines during charging and discharging, and also helps to filter out high frequency components that may appear on the DC bus lines.

It is sometimes desirable to be able to disconnect the battery from the DC bus lines in the UPS for substantial periods of time, and then reconnect the battery. For example, during transportation and long-term storage of a UPS, it is usually desirable to disconnect the batteries from the rest of the UPS circuitry to minimize drain on the batteries. The batteries may be disconnected from the DC bus lines using various devices, including switches or power plug connectors.

One problem which has been observed upon reconnection of batteries to the DC bus lines is that a large surge current is commonly drawn from the batteries to charge up the capacitor(s) connected across the DC bus lines. When a low impedance source, such as a battery, is connected to a low impedance load, such as a large capacitor with no charge on it, the initial current flow is limited only by the incidental impedances that may exist in the circuit. If, for example, the battery source impedance is on the order of 7 milliohms, the capacitor or capacitor bank has an effective resistance of 10 milliohms, the connectors between the battery and the capacitor have a very low resistance, and the battery has an output voltage of 48 volts, the initial peak current upon connection of the battery to the uncharged capacitors would theoretically be 2800 amperes. A surge current of this magnitude is potentially very detrimental to capacitor life, and can be sufficient to cause immediate capacitor failure. Furthermore, as the connecting switch is closed or the connectors are brought together, sparking of the switch contacts or the mating connectors can occur, which can be damaging to the connectors.

Conversely, when batteries which have been connected to the DC bus lines are disconnected, the charged capacitors connected to the DC bus lines can retain charge for a relatively long period of time, dependent on the internal leakage of the capacitors and any load that may be present on the DC bus lines. To minimize any safety hazards that this capacitor charge will present, it is generally necessary that provision be made to bleed down the voltage across the capacitors to an acceptable level within a prescribed period of time. Generally, the capacitors are considered to be safely discharged when the stored energy is reduced below 20 joules within 5 minutes. The voltage remaining on the capacitors is determined from the expression $E=\frac{1}{2} CV^2$, where E is energy in joules (e.g. 20 joules), C is the value of the capacitance of the capacitors, and V is the voltage on the capacitors. The conventional way in which this bleed-down is accomplished is by the addition of a bleed resistor connected across the capacitors. Because this bleed resistor is typically always connected across the capacitors, and thus across the DC bus lines, it is always dissipating energy. Thus, even if the UPS is in a standby mode, the resistor still bleeds down the capacitor and the battery.

SUMMARY OF THE INVENTION

In accordance with the present invention, the connection of batteries to the DC bus lines across which capacitors are connected, such as in an uninterruptible power system, is carried out using an auxiliary switch which is controlled to connect the batteries to one of the DC bus lines through a precharge resistor of selected size momentarily before connection is made through a main connector. The pre-connection of the batteries through the precharge resistance results in a controlled rate of charge of the capacitors before closing of the main connector provides a low resistance path between the batteries and the DC bus line. As a result, the initial surge current drawn from the batteries to charge the capacitor is limited to a peak current which does not stress the capacitor(s), the batteries, or any other circuit components. Further, the problem of arcing occurring upon initial connection of the main connector is eliminated.

Further, in accordance with the present invention, the disconnection of the main connector is accompanied by a change in position of the auxiliary switch both to disconnect the auxiliary circuit path from the batteries to the DC bus line through the precharge resistor and to connect the bus line to ground through a bleed resistor. Consequently, the batteries are fully isolated from the DC bus line by both the main connector and the auxiliary switch, and the capacitors are discharged at a controlled rate to ground level through the discharge resistor. This discharge resistor remains connected between the DC bus line and common as long as the main connector is disconnected, insuring that the charge on the capacitor remains at ground level. However, the discharge resistor is disconnected by the auxiliary switch from the DC bus line as a connection is being made at the main connector to reconnect the battery to the DC bus lines. Preferably, a single switch is utilized to both disconnect the discharge resistor from the DC bus line and to connect the precharge resistor between the battery and the DC bus line shortly before the connection is made at the main connector.

The present invention is especially suited for utilization with uninterruptible power systems which use batteries to provide backup power. During storage and shipment of these products, it is desirable that the batteries be disconnected from the DC bus line to isolate the batteries and to avoid drain on the batteries to the extent possible. When the uninterruptible power system is to be placed into service, the connection between the batteries and the DC bus lines can be made on-site by the user by simply making the connection at the main connector, which automatically activates the auxiliary switch to provide the pre-charge of the capacitors. Similarly, when the user wishes to change batteries or disconnect the batteries from the remainder of the UPS for storage or transport, a simple disconnection of the main connector will activate the auxiliary switch to provide the discharge of the capacitors to a safe level within the prescribed time.

The auxiliary switch may be conveniently formed as a switch mounted on the equipment cabinet adjacent to the main connector, with an actuating link arm extending from the switch to a position where it will be contacted by a movable section of the connector as the connection is made by the user. The link arm is engaged by the movable section of the connector just before electrical contact is made in the main connector to actuate the auxiliary switch, resulting in pre-charge of the capacitors connected to the DC bus lines.

Further objects, features and advantages of the invention will be apparent from the following detailed description when taken in conjunction with the accompanying drawings.

DETAILED DESCRIPTION OF THE INVENTION

Figure 1:
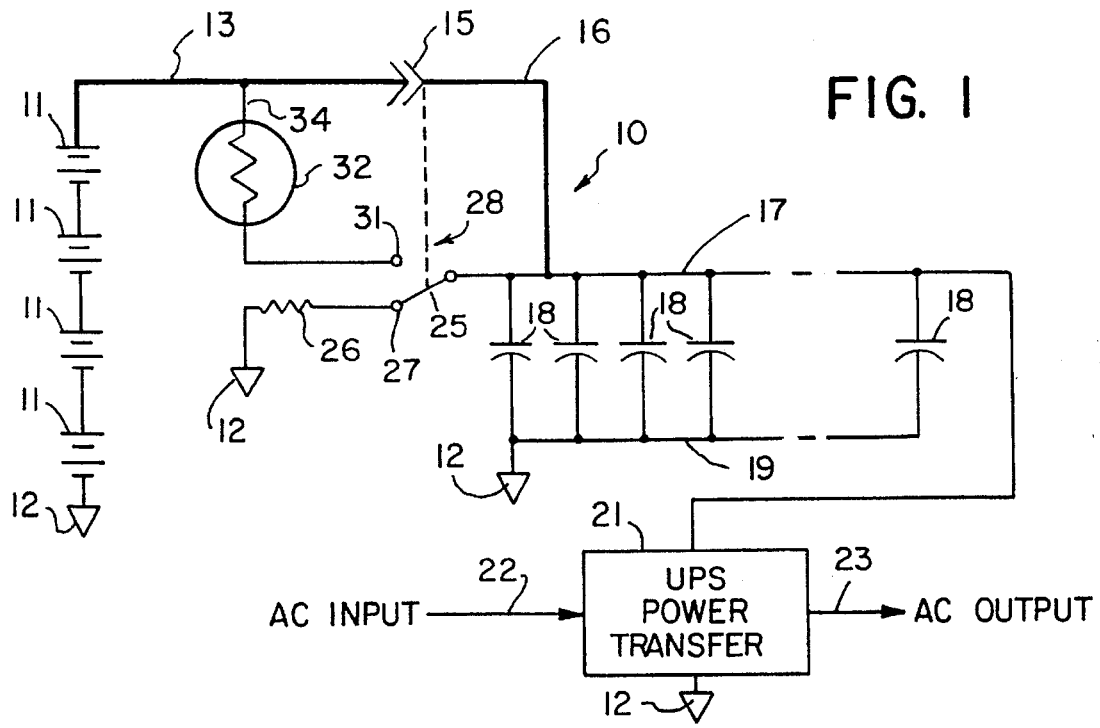
FIG. 1 is a schematic circuit diagram of the apparatus of the present invention utilized in an uninterruptible power system.

With reference to the drawings, the battery connection apparatus of the present invention is shown generally at 10 in FIG. 1 implemented in an uninterruptible power system. Although the present invention is of particular value in an uninterruptible power system (UPS), and is described herein as implemented in a UPS, the present invention may also be implemented in other power systems in which a battery is connected and disconnected from DC bus lines having large capacitors connected thereacross. A battery or series of batteries 11 is connected between a ground or common line 12 and a main connection 13. The batteries 11 may comprise, for example, lead acid batteries, which may be connected in series as shown in FIG. 1, to provide a desired output voltage level which is suitable for the particular application, for example, 48 volts. However, it should be understood that the present invention may be used with a single battery of any type, or multiple batteries. As used herein, a "battery" includes a single cell, a unitary battery of cells, or a series or parallel connection of several unitary batteries.

A main connector 15 is connected in a power path between the batteries 11 and a DC bus line 17. One or more capacitors 18 are connected between the DC bus line 17 (the high or "hot" line) and a second DC bus line 19 which is connected to the ground or common line 12 which is connected to the batteries 11 as the DC return line to return current to the batteries 11.

Power transfer components 21 of the uninterruptible power system are connected to receive the DC power from the bus line 17 and also receive AC input power on input lines 22. The power transfer components 21 provide AC output power on output lines 23 to consuming equipment (not shown), e.g., a computer. The power transfer components 21 are also connected to the common 12 to return DC current to the batteries 11 and the capacitors 18.

The uninterruptible power system power transfer components 21 may be from any type of UPS which receives AC input power and has DC bus lines across which batteries and capacitors are connected, including double conversion, ferroresonant, line interactive, and other types of UPS configurations. An example of a suitable UPS power transfer configuration, which operates an inverter to provide AC power (derived from the batteries 11 through the DC bus lines 17 and 19) to the output lines 23 when the input power on the lines 22 fails, is shown in U.S. Pat. No. 5,315,533, issued May 24, 1994, entitled Back-Up Uninterruptible Power System, the disclosure of which is incorporated herein by reference.

During transportation or storage of the uninterruptible power system, it is generally desirable and even necessary to disconnect the batteries 11 from the DC bus line 17 to avoid unnecessary drain on the batteries and to reduce the chance of accidental shorting of the batteries. To accomplish this, the connector 15 is opened to electrically isolate the batteries 11 from the DC bus line 17 and the rest of the UPS components 21. However, because the capacitors 18 are charged to the voltage level of the batteries 11 at the time the connector 15 is opened, the capacitors 18 will retain a charge for a long period of time unless they are discharged in some manner. In the present invention, an auxiliary switch 25 is connected to the DC bus line 17 and has a first switch position, shown in FIG. 1, when the connector 15 is opened which connects the hot bus line 17 by a switch contact terminal 27 through a discharge or bleed resistor 26 to ground or common 12. A typical preferred time to discharge the bank of capacitors 18 through the discharge or bleed resistor 26 to a safe level (near ground level) is 5 minutes. The auxiliary switch 25 is switched to its first position shown in FIG. 1 by a mechanical actuating linkage 28 connecting the switch 25 to the main connector 15 such that when the connection at the main connector 15 is broken, the switch 25 is closed to connect the switch to the contact terminal 27 connected to the discharge or bleed resistor 26. It is seen that in the first switch position shown in FIG. 1 the batteries 11 are isolated from the DC bus line 17 by the mechanically opened main connector 15 and the open switch 25. In this state, the system is prepared for long term storage or transportation.

When it is desired to reconnect the batteries to the DC bus line 17, the user manually reconnects the main connector 15. In the process of doing so, the mechanical linkage 28 between the main connector 15 and the auxiliary switch 25 is activated to switch to a second position of the switch 25; this changes the switch position to make contact with a second contact terminal 31 which connects a precharge resistor 32 between the batteries 11 and the DC bus line 17 shortly before electrical contact is made by the main connector 15. The result is a surge of current, at a level controlled by the resistance of the precharge resistor 32, from the batteries 11 through the switch 25 to the DC bus line 17 to pre-charge the capacitor bank 18. Generally, it is preferred that the resistance of the resistor 32 be selected to charge up the capacitors 18 to a level near their full charge value in about one-half second, and thus it is preferred that the actuating linkage 28 be operable to change the position of the switch 25 as the main connector 15 is being closed about one-half second before full electrical contact is made in the main power path between the lines 13 and 16 by the connector 15. When the main connector 15 is closed, providing a very low resistance path from the batteries 11 through the conductors 13 and 16 to the DC bus line 17, the capacitors 18 are already charged to a level such that their voltage is near the voltage across the string of batteries 11, and no significant surge of current occurs. Subsequent disconnection of the main connector 15 activates the actuating link 28 to change the switch 25 back to the first position shown FIG. 1, connecting the DC bus line 17 to the contact 27. It is preferred that the precharge resistor 32 be a positive temperature coefficient (PTC) resistor for circuit self-protection. If a fault occurs, such as a short in the UPS transfer components 21, the increased current flowing through the PTC precharge resistor 32 will cause the resistor 22 to increase in temperature and become a high impedance.

The connection of the precharge resistor 32 to the batteries 11 is made through a connecting line 34 which is electrically connected to the main power path line 13 at a position in the line 13 ahead of the main connector 15. For complete disconnection of the batteries 11 from the remaining UPS components, the line 34 can be disconnected from the line 13 after the main connector 15 has been disconnected. During routine transportation and storage of the UPS, the batteries 11 are not physically removed from the remainder of the UPS, so that disconnection of the conducting line 34 from the main power path line 13 is not required.

Figure 2:
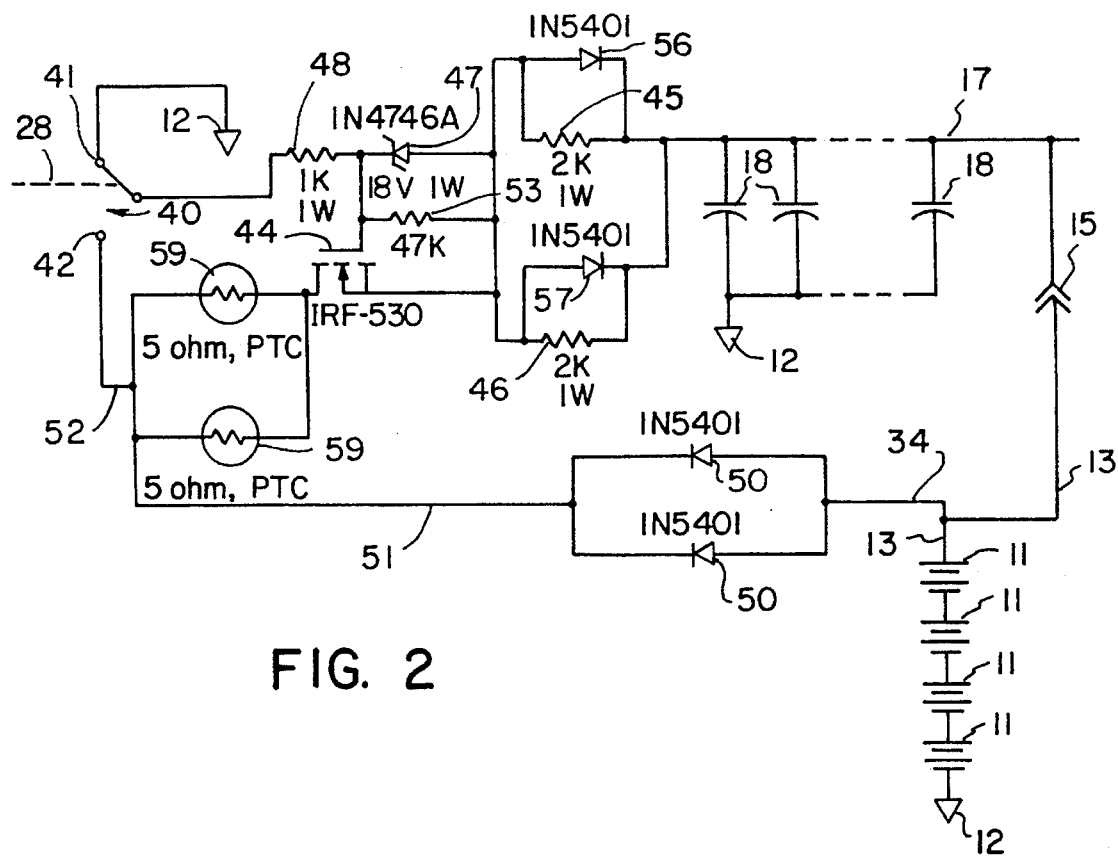
FIG. 2 is a schematic circuit diagram of another implementation of the circuit of FIG. 1.

The battery connection and disconnection circuit in accordance with the present invention can be implemented in various ways in addition to the basic circuit configuration illustrated in FIG. 1. An example of a circuit utilizing a static power switch as part of the auxiliary switch is shown in FIG. 2. In the circuit of FIG. 2, the auxiliary switch includes a mechanical switch 40 having a first contact terminal 41 and a second contact terminal 42. The switch 40 is linked by the mechanical actuating linkage 28 to the main connector 15. In addition to the switch 40, the auxiliary switch also includes a power transistor 44 having power terminals and a control gate by which the power conducted between the power terminals can be controlled. One such suitable device is a power MOSFET, although other solid state devices may be used. When the connector 15 is open, the mechanical linkage 28 causes the switch 40 to be in the position shown in FIG. 1 in which the common line of the switch is connected to the contact point 41 which is connected to ground or common 12. A current path is thereby formed from the DC bus line 17—to which the charged capacitors 18 are connected—through paralleled resistors 45 and 46, through a zener diode 47, which acts as a forward biased diode, and then through another discharge resistor 48 and the switch 40 to ground or common 12. The paralleled resistors 45 and 46 and the series connected resistor 48 together function as the discharge resistor 26 of FIG. 1. As the connector 15 is closed by the operator, the switch 40 is switched to its second position making contact with the terminal point 42. This provides a current path from the batteries 11 through forward biased diodes 50, and through a line 51 connected to a line 52 leading to the contact terminal 42, through the switch 40 and the resistor 48, through a biasing resistor 53, and thence through forward biased parallel diodes 56 and 57 to the DC bus line 17. Because of the resistance of the resistors 48 and 53 in this path, the peak current flow on the path is limited. The resistors 48 and 53 form a voltage divider, with the voltage across the resistor 53 increasing until it reaches the gate to source turn-on voltage of the MOSFET 44. The zener breakover voltage of the diode 47 (e.g. 18 volts) clamps the voltage from the gate to source of the MOSFET 44 to protect the gate from potential over voltage. The resistors 48 and 53 and the zener diode 47 thus form a bias network for the MOSFET 44 to allow proper turn-on and turn-off of the device. When the MOSFET 44 is turned on, current flows from the batteries 11 through two paralleled PTC resistors 59, through the MOSFET 44, and through the paralleled diodes 56 and 57 to the DC bus line 17. The paralleled PTC resistors 59 function as the precharge resistor 32 of FIG. 1.

The values of the resistances in the pre-charge circuit, and particularly the PTC resistors 59, are selected to provide a rapid but controlled charge of the capacitors 18, with a typical preferable charge time of about one-half second. This generally is comparable to the time required to complete the physical connection of the main connector 15 by hand and yet allows charging to occur at a peak current level which will not stress either the capacitors 18 or the batteries 11 or other components of the system.

As is apparent from the circuit of FIG. 1, the auxiliary switch 25 can be implemented in various ways, including solid state as well as mechanical switches (e.g., "Microswitch"™ type switches), reed switches (e.g., actuated by a magnet mounted to a portion of the main connector), and using two or more separate switches to perform the function of the switch 25. As used herein, the term "switch" is intended to refer to any such device or devices capable of controlling electrical current in response to a mechanical actuation. For example, two separate switches may be utilized which are connected by the mechanical actuating link 28 to the main connector 15, one switch to connect the discharge resistor 26 to the DC bus line 17 when the connector 15 is opened, and another switch to connect the precharge resistor between the batteries 11 and the DC bus line 17 as the connector 15 is being closed. It is generally preferable to have a single mechanical switch with two (or more) positions, as illustrated in FIGS. 1 and 2, linked by the linkage 28 to the main connector 15 so that the switch can only be in one position or the other to avoid possible short circuits through the mechanical switch from the batteries to ground. It is noted that in the circuit of FIG. 2, no damage to the circuit should occur even if electrical connection is made in the main connector 15 (to apply the full battery voltage to the DC bus line 17) before the switch 40 is switched from its position shown in FIG. 2. Even if the switch 40 were to remain connected to ground as shown in FIG. 2, the circuit path to ground includes the parallel resistors 45 and 46 and the series resistor 48, thereby limiting the total current flow to ground through this path.

Figure 3:
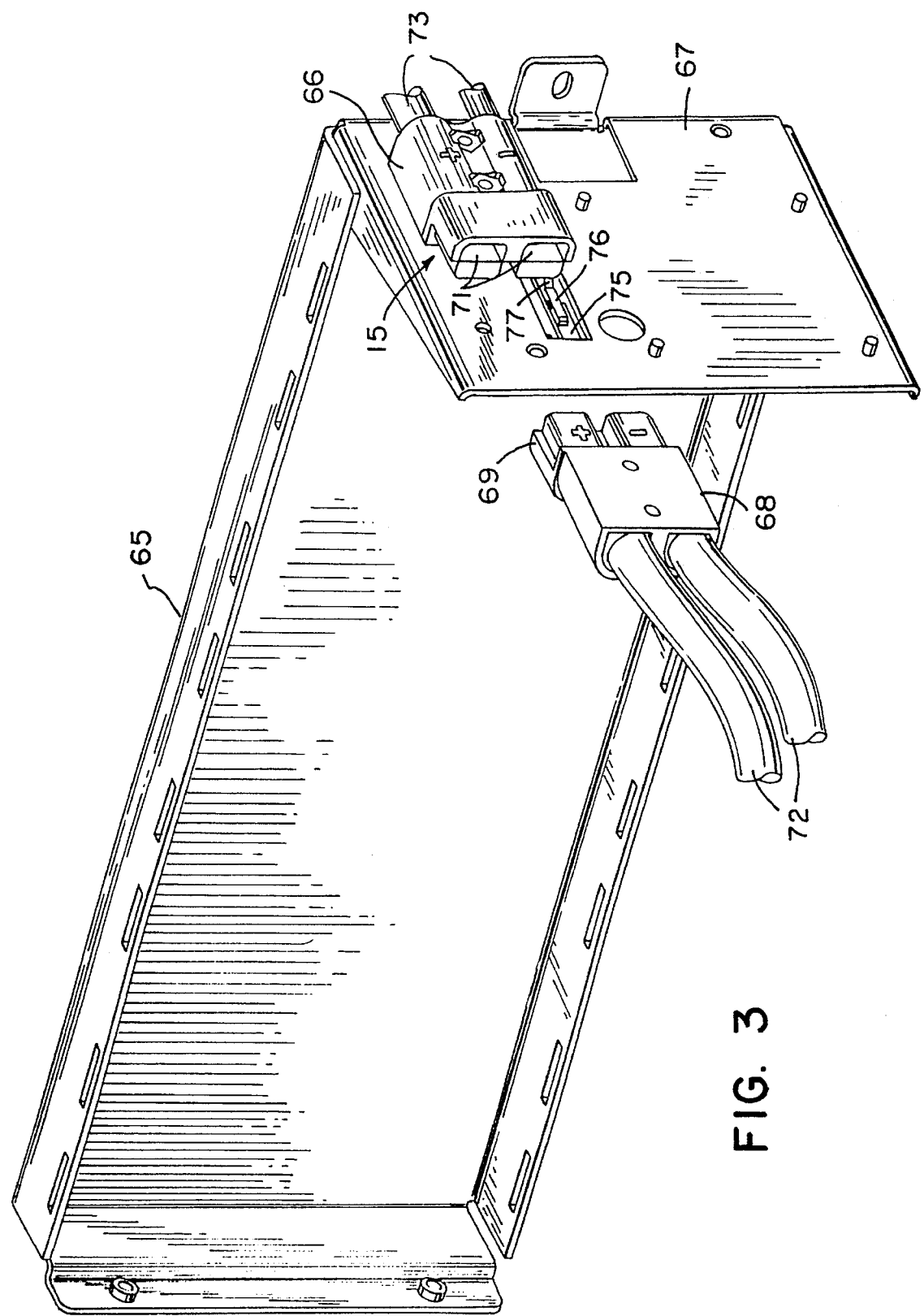
FIG. 3 is a simplified perspective view illustrating the apparatus of the invention mounted to a cabinet of a power supply system to be actuated as the main connector is connected.
Figure 4:
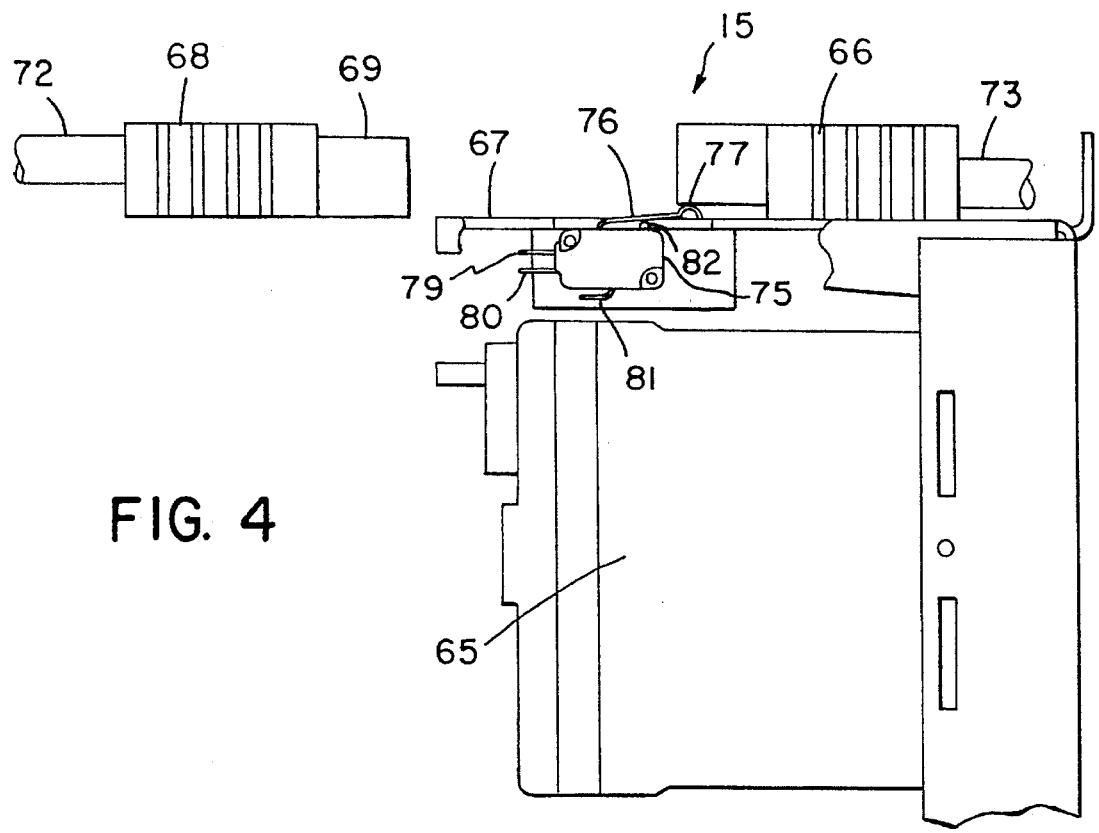
FIG. 4 is a side view of the main connector and the auxiliary switch of the present invention showing the position of the auxiliary switch before the main connector is connected.
Figure 5:
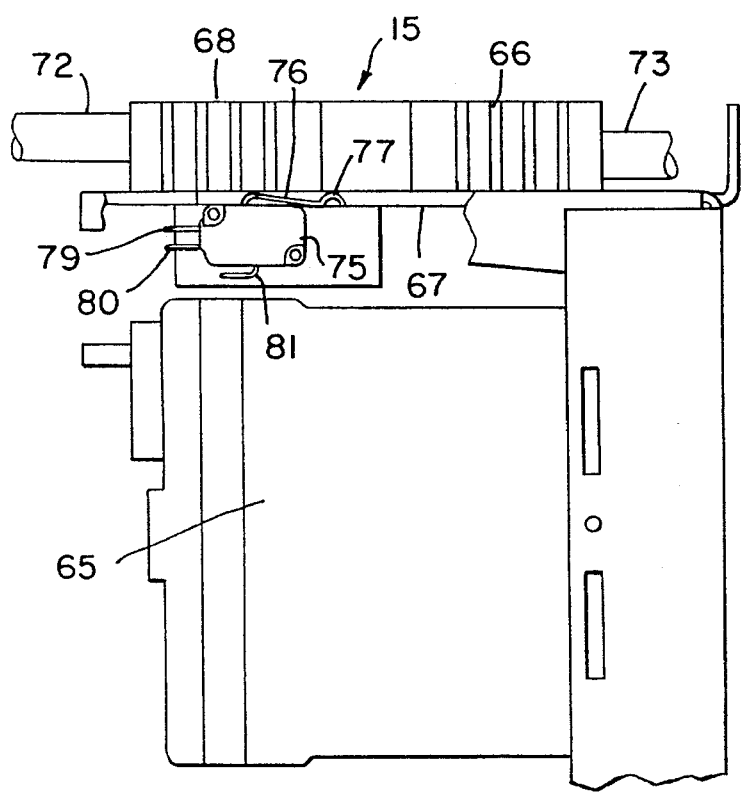
FIG. 5 is a side view as in FIG. 4 showing the auxiliary switch in its position when the main connector is fully connected.

An exemplary mechanical linkage which provides a means for actuating the auxiliary switch as described above is illustrated with respect to the views of FIG. 3–5. FIG. 3 shows an illustrative view of a portion of a cabinet 65 of a unit to which battery power is to be connected, such as an uninterruptible power system. The exemplary system includes a high current capacity main connector 15 (e.g., an "SB" connector available from Anderson Power Products) having a fixed section 66 attached to one panel 67 of the cabinet 65, and a mating movable section 68 having positive and negative plug contacts (not shown) within a housing or shell 69 which are adapted to fit into contact receptacles 71 in the fixed section 66. Flexible power cords 72 are connected to the movable section 68 of the connector, and power cords 73 extend from the fixed section 66 of the connector. To provide an electrical connection, the user grasps the movable section 68 by hand and inserts the plug contacts into the receptacles 71 in the fixed section 66.

A switch 75 is mounted to the panel 67 and has a link arm 76 which extends outwardly to a position where a tab 77 formed on the end of the link arm is positioned in the gap where one of the plugs of the connector 15 will fit as the two sections of the connector are brought together. As best illustrated in the side view of FIG. 4, the switch 75, corresponding to the auxiliary switch 25 of FIG. 1 or the switch 40 of FIG. 2 (in which case it would form part of the auxiliary switch) has output leads 79 and 80, connected to the two switch contact terminals, and a common output lead 81. For example, the line 79 may be connected to the ground or common 12 of FIG. 2, the output lead 80 may be connected to the connecting line 52 of FIG. 2, and the common lead 81 may be connected to the resistor 48 as shown in FIG. 2. The switch 75 has a button 82 which extends out of the body of the switch and which is spring-loaded upwardly to press against the link arm 76. As shown in FIG. 4, the link arm 76 extends upwardly in the normal position when the connector 15 is open and with the tab 77 positioned just under the receptacle 71 of the fixed section 66 of the connector. As the movable section 68 is brought into engagement with the fixed receptacle section 66 of the connector 15, the shell 69 of the connector about the plug contacts makes contact with the tab 77 on the link arm 76, depressing the link arm downwardly and pushing the button 82 inwardly to change the position of the switch 75. The tab 77 is positioned so that it is pressed downwardly to close the switch 75 at a time prior to the time when electrical contact is made between the electrical plug contacts of the connector section 68 and the corresponding electrical contacts within the receptacles 71 of the fixed section 66. Generally, where the connection is made by user who inserts the plugs of the section 68 into the receptacles of the section 68 by hand, about one-half second elapses between the closure of the switch 75 and the making of electrical contact between the electrical contacts within the connector 15, which are recessed within the enclosing shells of the connector sections 66 and 68. FIG. 5 illustrates the connector section 68 and the fixed section 66 fully connected and the link arm 76 of the switch 75 depressed by the shell 69 of the connector section 68.

It should be understood that other main electrical connectors could be used in place of an Anderson type connector, including a main switch which is mechanically linked to the separate switch 75 so that the switch 75 closes a predetermined and suitable length of time before closure of the main contacts in the main switch. If desired, time delay relays may be utilized in the main power path from the main connector to provide a delay to allow sufficient time to recharge the capacitors utilizing the auxiliary switch. Further, the switch may have more than two positions, with an intermediate switch position connected to provide charging of the capacitor at a different rate (e.g., at a lower rate by charging through a higher resistance precharge resistor) than is provided in the fully ON switch position.

These and other modifications of the present invention will be apparent to those of ordinary skill in the art. It is thus understood that the present invention is not limited to the embodiments herein illustrated and described, but embraces all such modified forms thereof as come within the scope of the following claims.

What is claimed is:
1. Electrical power connection apparatus comprising:
 (a) a battery;
 (b) a DC bus line, a common line connected to the battery, and a capacitor connected between the DC bus line and the common line;
 (c) a main connector connected in a power conduction path from the battery to the DC bus line, the main connector operable to be closed to provide conduction therethrough and to be opened to interrupt conduction; and
 (d) an auxiliary switch and a precharge resistor connected between the battery and the DC bus line, the auxiliary switch including a mechanically actuated switch having two positions, a first position in which current flow is blocked from the battery through the precharge resistor to the DC bus line and a second position in which current is passed from the battery through the precharge resistor, and a link arm having a portion extending upwardly from the switch and positioned to engage an actuator button of the switch to switch the same from the first position to the second position as the link arm is depressed downwardly, the link arm having a tab portion extending upwardly to be contacted by a movable section of the main connector as the movable section is engaged by a user to a fixed section of the main connector, to complete a circuit path from the battery to the capacitor through the precharge resistor as the main connector is being closed and for a period of time prior to electrical connection through the main connector from the battery to the capacitor, the resistance of the precharge resistor controlling the level of the peak charging current passing through the precharge resistor to the capacitor.

2. The apparatus of claim 1 wherein the precharge resistor is a positive temperature coefficient resistor having an impedance which increases with the temperature of the resistor to limit current flow under fault conditions.

3. The apparatus of claim 1 wherein the auxiliary switch comprises a mechanical switch having two positions, the means for actuating operative to actuate the switch to switch its positions, and a power transistor having power terminals and a gate, the power transistor power terminals connected in a conducting path with the precharge resistor between the battery and the DC bus line, the switch connected in a conducting path between the battery and a bias network for the gate of the power transistor such that when the means for actuating actuates the switch to close to complete a conducting path from the battery through the switch to the biasing network, the gate of the power transistor has a voltage applied thereto to cause conduction of the power transistor to conduct current from the battery through the precharge resistor and the power transistor to the DC bus line to charge the capacitor.

4. The apparatus of claim 1 wherein the auxiliary switch has a second position which provides a conducting path from the battery through the auxiliary switch and the precharge resistor to the DC bus line when actuated by the means for actuating, and a first position in which a conducting path is formed from the DC bus line through a discharge resistor and the auxiliary switch to the common line, the means for actuating switching the auxiliary switch from the second position to the first position when the main connector is disconnected to provide a controlled discharge of the capacitor through the discharge resistor after disconnection of the main connector.

5. The apparatus of claim 1 wherein the battery comprises at least two separate batteries connected in series and the capacitor comprises at least two separate capacitors connected in parallel between the DC bus line and the common line.

6. The apparatus of claim 1 wherein the main connector comprises two sections, a fixed section and a movable section, the movable section having plug contacts adapted to be inserted into receptacles in the fixed section, and wherein the means for actuating is contacted by the movable section as the movable section is inserted into the receptacle on the fixed section.

7. Electrical power connection apparatus comprising:

(a) a battery;

(b) a DC bus line, a common line connected to the battery, and a capacitor connected between the DC bus line and the common line;

(c) a main connector connected in a power conduction path from the battery to the DC bus line, the main connector operable to be closed to provide conduction therethrough and to be opened to interrupt conduction;

(d) an auxiliary switch and a discharge resistor connected between the DC bus line and the common line, the auxiliary switch including a mechanically actuated switch having two positions, a first position in which current flow is passed from the DC bus line through the discharge resistor to the common and a second position in which current is blocked from the DC bus line to the common line, and a link arm having a portion extending upwardly from the switch and positioned to engage an actuator button of the switch to switch the same from the first position to the second position as the link arm is depressed downwardly, and to switch the switch from the second position to the first position as the link arm is released upwardly, the link arm having a tab portion extending upwardly to be contacted by a movable section of the main connector as the movable section is engaged by a user to a fixed section of the main connector and to be released from contact as the movable section is removed from the fixed section of the main connector, to complete a circuit path from the DC bus line to the common line through the discharge resistor when the main connector is opened, the resistance of the discharge resistor controlling the rate of bleed down of any charge on the capacitor connected between the DC bus line and the common line.

8. The apparatus of claim 7 further including a precharge resistor, the precharge resistor and the auxiliary switch connected between the battery and the DC bus line such that a current path is provided from the battery through the precharge resistor and the switch to the DC bus line when the switch is in its second position, and wherein the current path is blocked when the auxiliary switch is in its first position.

9. The apparatus of claim 8 wherein the precharge resistor is a positive temperature coefficient resistor having an impedance which increases with the temperature of the resistor to limit current flow under fault conditions.

10. The apparatus of claim 8 wherein the auxiliary switch comprises a mechanical switch having two positions, the link arm operative to actuate the switch to switch positions, and a power transistor having power terminals and a gate, the power transistor power terminals connected in a conducting path with a precharge resistor between the battery and the DC bus line, the switch connected in a conducting path between the battery and a bias network for the gate of the power transistor such that when the link arm actuates the switch to close to complete a conducting path from the battery through the switch to the biasing network, the gate of the power transistor has a voltage applied thereto to cause conduction of the power transistor to conduct current from the battery through the precharge resistor and the power transistor to the DC bus line to charge the capacitor.

11. The apparatus of claim 7 wherein the main connector comprises two sections, a fixed section and a movable section, the movable section having plug contacts adapted to be inserted into receptacles in the fixed section, and wherein the means for actuating is contacted by the movable section as the movable section is inserted into the receptacle on the fixed section.

12. The apparatus of claim 7 wherein the battery comprises at least two separate batteries connected in series and the capacitor comprises at least two separate capacitors connected in parallel between the DC bus line and the common line.

13. The apparatus of claim 12 wherein the precharge resistor is a positive temperature coefficient resistor having an impedance which increases with the temperature of the resistor to limit current flow under fault conditions.

14. Electrical power connection apparatus comprising:

(a) a battery;

(b) a DC bus line, a common line connected to the battery, and a capacitor connected between the DC bus line and the common line;

(c) a main connector connected in a power conduction path from the battery to the DC bus line, the main connector operable to be closed to provide conduction therethrough and to be opened to interrupt conduction;

(d) an auxiliary switch, a precharge resistor, and a discharge resistor, the precharge resistor and the auxiliary switch connected between the battery and the DC bus line, and the discharge resistor and the auxiliary switch connected between the DC bus line and the common line, the auxiliary switch having two positions, a first position in which current flow is blocked from the battery through the precharge resistor to the DC bus line and current is passed from the DC bus line through the auxiliary switch and the discharge resistor to the common line, and a second position in which current is blocked by the auxiliary switch from flowing from the DC bus line through the discharge resistor to common and in which current is passed from the battery through the auxiliary switch and the precharge resistor to the DC bus line, the auxiliary switch including a mechanically actuated switch having the first and second positions, and a link arm having a portion extending upwardly from the switch and positioned to engage an actuator button of the switch to switch the same from the first position to the second position as the link arm is depressed downwardly, the link arm having a tab portion extending upwardly to be contacted by a movable section of the main connector as the movable section is engaged by a user to a fixed section of the main connector, to actuate the auxiliary switch to be in its first position when the main connector is opened and to actuate the auxiliary switch to switch to its second position to complete a current path from the battery to the capacitor through the precharge resistor as the main connector is being closed and for a period of time prior to electrical connection through the main connector from the battery to the capacitor, the resistance of the precharge resistor controlling the level of the peak current passing to the capacitor when the auxiliary switch is in its second position and the resistance of the discharge resistor controlling the rate of discharge of a charge on the capacitor when the auxiliary switch is in its first position.

15. The apparatus of claim 14 wherein the auxiliary switch comprises a mechanical switch having two positions, the means for actuating operative to actuate the switch to switch its positions, and a power transistor having power terminals and a gate, the power transistor power terminals connected in a conducting path with the precharge resistor between the battery and the DC bus line, the switch connected in a conducting path between the battery and a bias network for the gate of the power transistor such that when the means for actuating actuates the switch to close to complete a conducting path from the battery through the switch to the biasing network, the gate of the power transistor has voltage applied thereto to cause conduction of the power transistor to conduct current from the battery through the precharge resistor and the power transistor to the DC bus line to charge the capacitor.

16. The apparatus of claim 14 wherein the battery comprises at least two separate batteries connected in series and the capacitor comprises at least two separate capacitors connected in parallel between the DC bus line and the common line.

17. The apparatus of claim 14 wherein the main connector comprises two sections, a fixed section and a movable section, the movable section having plug contacts adapted to be inserted into receptacles in the fixed section, and wherein the means for actuating is contacted by the movable section as the movable section is inserted into the receptacle on the fixed section.

18. Electrical power connection apparatus comprising:

(a) a DC bus line, a common line adapted for connection to a battery, and a capacitor connected between the DC bus line and the common line;

(b) a main connector adapted for connecting a battery in a power conduction path to the DC bus line, the main connector operable to be closed to provide conduction therethrough and to be opened to interrupt conduction, the main connector comprising two sections, a fixed section and a movable section, the movable section having plug contacts adapted to be inserted into receptacles in the fixed section and;

(c) a mechanically actuated auxiliary switch, a precharge resistor, and a discharge resistor, the precharge resistor and the auxiliary switch adapted to be connected between a battery and the DC bus line, and the discharge resistor and the auxiliary switch connected between the DC bus line and the common line, the auxiliary switch having two positions, a first position in which current flow is blocked from a battery through the precharge resistor to the DC bus line and current is allowed to pass from the DC bus line through the auxiliary switch and the discharge resistor to the common line, and a second position in which current is blocked by the auxiliary switch from flowing from the DC bus line through the discharge resistor to common and in which current is allowed to pass from a battery through the auxiliary switch and the precharge resistor to the DC bus line, and a link arm having a portion extending upwardly from the switch and positioned to engage an actuator button of the switch to switch the same from the first position to the second position as the link arm is depressed downwardly, the link arm having a tab portion extending upwardly to be contacted by the movable section of the main connector as the movable section is inserted into the receptacle on the fixed section, to actuate the auxiliary switch to be in its first position when the main connector is opened and to actuate the auxiliary switch to switch to its second position to complete a current path from a battery to the capacitor through the precharge resistor as the main connector is being closed and for a period of time prior to electrical connection through the main connector from the battery power input terminal to the capacitor, the resistance of the precharge resistor controlling the level of the peak current passing through the precharge resistor to the capacitor when the auxiliary switch is in its second position and the resistance of the discharge resistor controlling the rate of discharge of a charge on the capacitor when the auxiliary switch is in its first position.

19. The apparatus of claim 18 wherein the precharge resistor is a positive temperature coefficient resistor having an impedance which increases with the temperature of the resistor to limit current flow under fault conditions.

20. The apparatus of claim 18 comprising additionally a power transistor having power terminals and a gate, the power transistor power terminals connected in a conducting path with the precharge resistor between a battery and the DC bus line, the switch connected in a conducting path between a battery and a bias network for the gate of the power transistor such that when the means for actuating actuates the switch to close to complete a conducting path from the battery through the switch to the biasing network, the gate of the power transistor has voltage applied thereto to cause conduction of the power transistor to conduct current from the battery through the precharge resistor and the power transistor to the DC bus line to charge the capacitor.

21. The apparatus of claim 18 wherein the capacitor comprises at least two separate capacitors connected in parallel between the DC bus line and the common line.

* * * * *